No. 844,729. PATENTED FEB. 19, 1907.
W. A. JORDAN.
GEAR CUTTING MACHINE.
APPLICATION FILED JAN. 29, 1906.
4 SHEETS—SHEET 2.

Witnesses
R. H. Newman
Elbert O. Hill

Inventor
Watson A. Jordan
By Chamberlain & Newman
Attorneys

No. 844,729. PATENTED FEB. 19, 1907.
W. A. JORDAN.
GEAR CUTTING MACHINE.
APPLICATION FILED JAN. 29, 1906.
4 SHEETS—SHEET 3.
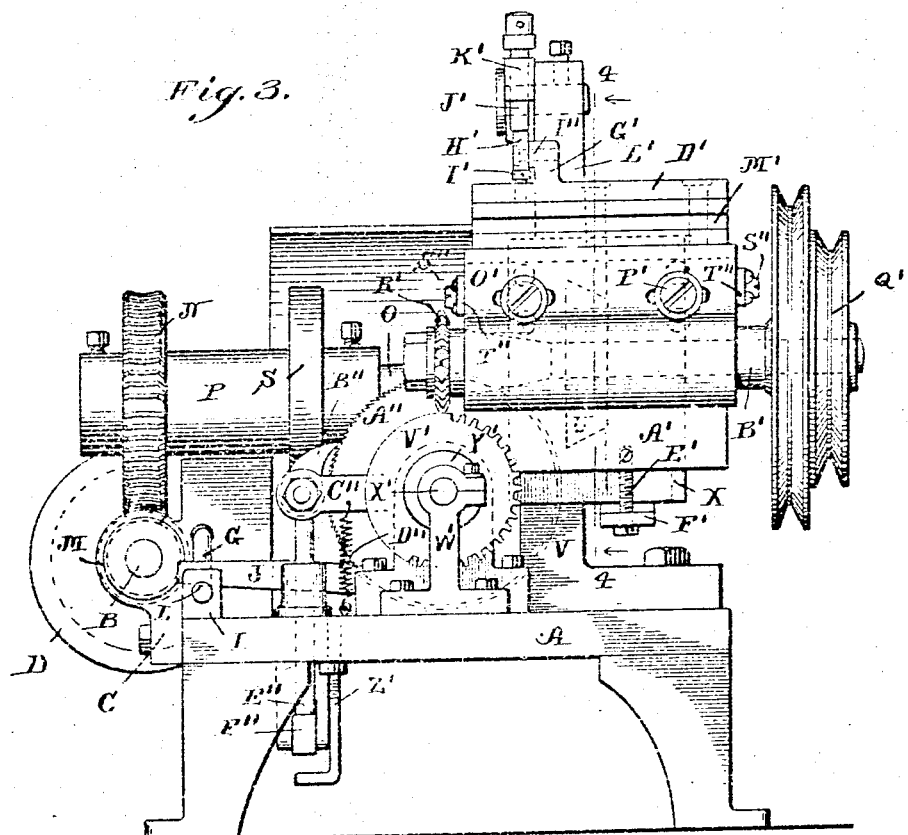
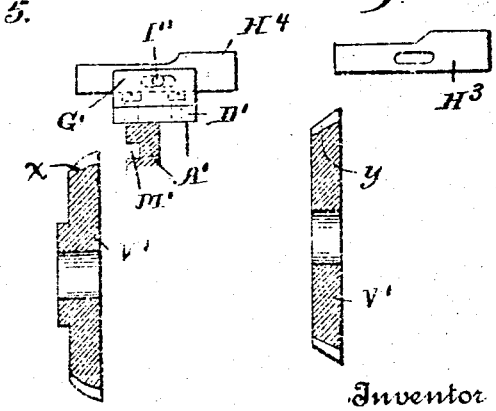
Witnesses
R. H. Newman
Elbert O. Hull
Inventor
Watson A. Jordan
By Chamberlain & Newman
Attorneys No. 844,729. PATENTED FEB. 19, 1907.
W. A. JORDAN.
GEAR CUTTING MACHINE.
APPLICATION FILED JAN. 29, 1906.

4 SHEETS—SHEET 4.

Witnesses
R. H. Newman
Elbert O. Hull

Inventor
Watson A. Jordan
By Chamberlain & Newman
Attorneys

UNITED STATES PATENT OFFICE.

WATSON A. JORDAN, OF BRIDGEPORT, CONNECTICUT, ASSIGNOR TO THE STANDARD MANUFACTURING COMPANY, OF BRIDGEPORT, CONNECTICUT, A CORPORATION OF CONNECTICUT.

GEAR-CUTTING MACHINE.

No. 844,729.   Specification of Letters Patent.   Patented Feb. 19, 1907.

Application filed January 29, 1906. Serial No. 298,339.

*To all whom it may concern:*

Be it known that I, WATSON A. JORDAN, a citizen of the United States, and a resident of Bridgeport, in the county of Fairfield and State of Connecticut, have invented certain new and useful Improvements in Gear-Cutting Machines, of which the following is a specification.

My invention relates to new and useful improvements in gear cutting or milling machines such as are used in the production of both regular and special work, including straight and bevel gears, wheels, and disks with numerous shapes of teeth for use as gears, cutters, ratchet-wheels, and the like.

It is the object of my invention to construct a machine that will cut a large range of sizes and styles of small gears, cutters, and special blanks, which will be automatic in its operations and requiring very little attention upon the part of the operator, which will be comparatively simple in construction and inexpensive to build, and finally a machine that can be easily changed and adjusted for performing any one of its several styles of cuts.

Upon the accompanying four sheets of drawings, forming a part of this specification, similar characters of reference denote like or corresponding parts throughout the several figures, and of which—

Figure 1:
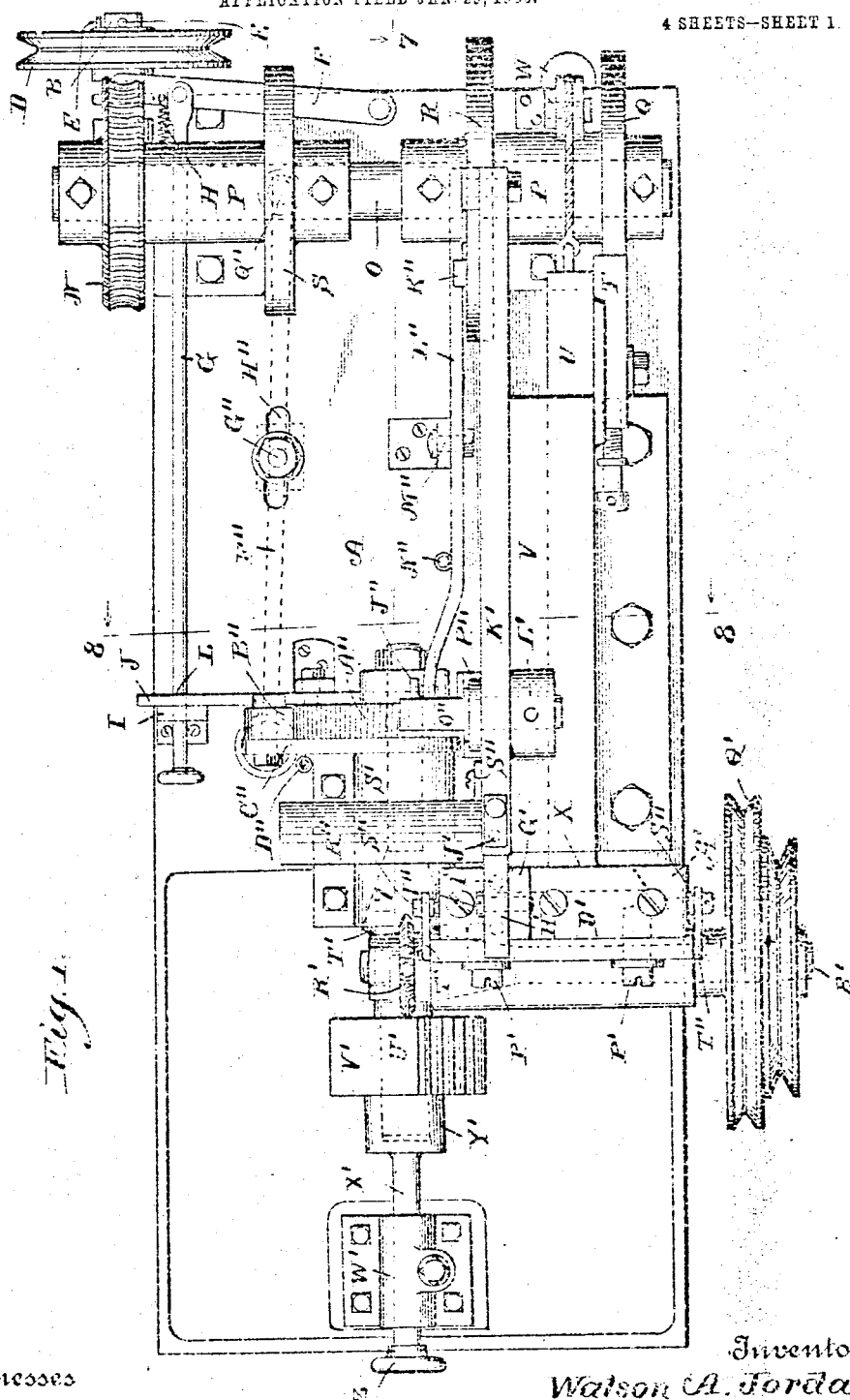
Figure 2:
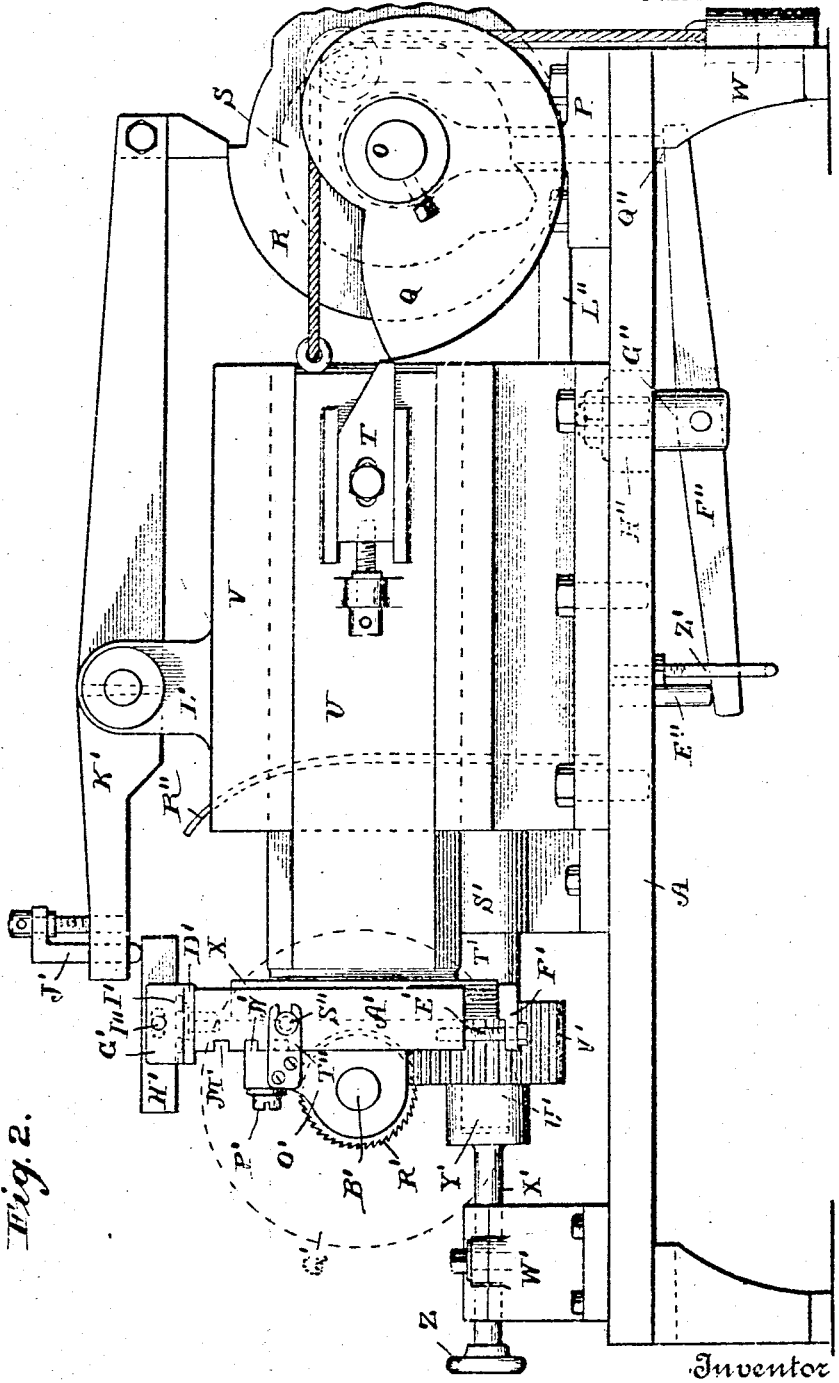
Figure 7:
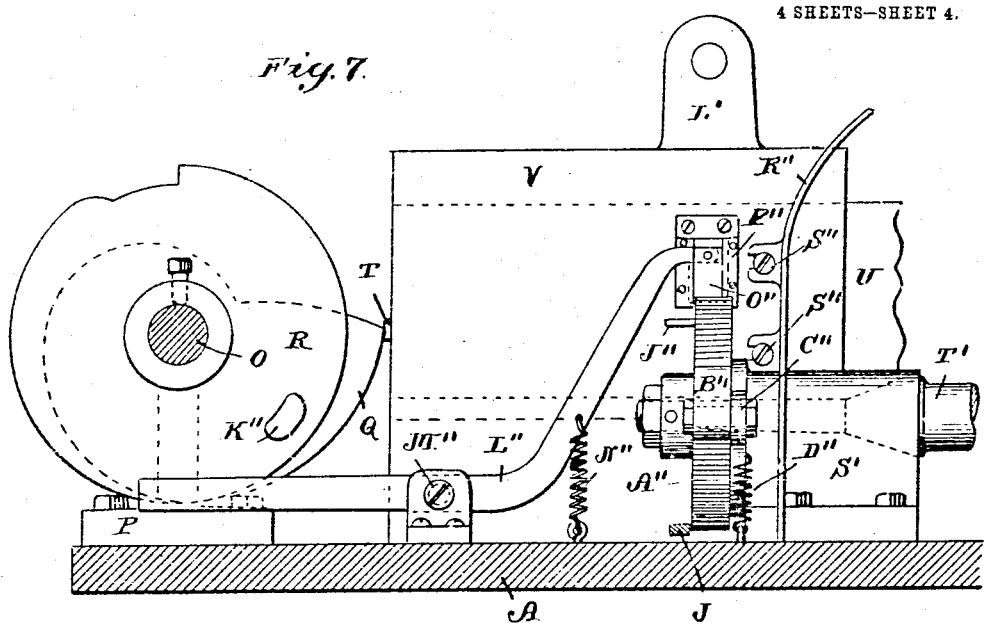
Figure 8:
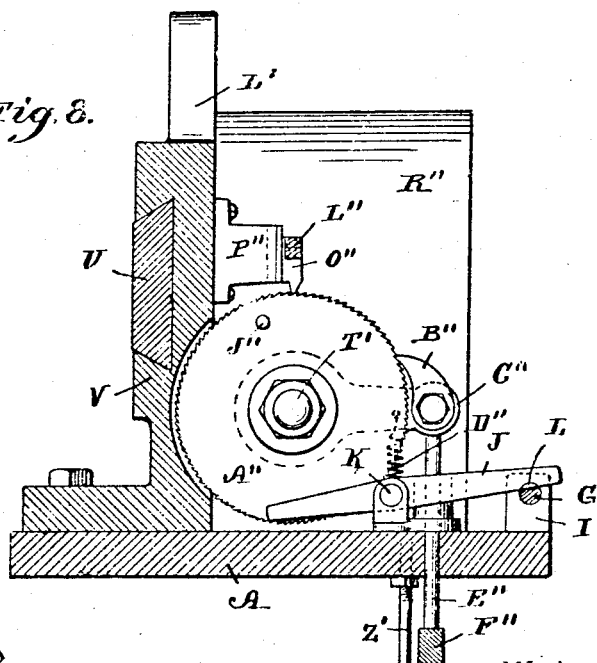

Figure 1 shows a plan view of my machine complete. Fig. 2 is a side elevation of the machine as seen from the near side of Fig. 1. Fig. 3 shows a front elevation as seen from the left of Fig. 1. Fig. 4 is a central vertical sectional view through the head of the slide and cutter-shaft carried thereon, taken on line 4 4 of Fig. 3. Fig. 5 shows a detail of a modified form of guide carried on the head of slide, the shape of said guide being such as to produce circular cuts $x$ upon the blank like that shown in the periphery of the blank V′, also shown in said figure. Fig. 6 is a detached side elevation of a further modified form of slide, such as would be required to produce cuts $y$ like those shown in blank V′ of same figure. Fig. 7 is a central fragmentary sectional view of the machine, taken on line 7 7 of Fig. 1; and Fig. 8 is a cross-section taken on line 8 8 of Fig. 1.

Referring in detail to the characters of reference marked upon the drawings, A indicates the bed of the machine, which is supported upon legs, as shown.

B represents a driving-shaft that is journaled in bracket C, secured to the bed of the machine. This shaft has a belt-pulley D slidably mounted thereon and connectible to the shaft B by means of engaging pins E E, which contact to form an operative engagement when the pulley is in its outermost position, as shown in Fig. 1. This pulley obviously is designed to be shifted longitudinally upon the shaft to make and break connections, thus forming means for starting and stopping the machine. A lever F, pivoted to the bed, is connected with the hub of the pulley to engage the same through the rod connection G against the action of spring H, which spring obviously tends to disconnect the pulley from the shaft when released. In the starting of the machine the rod G, mounted in bracket I, is shoved backward until the outer end of lever J, pivoted at K, drops into the notch L of the rod which holds the same outward against the action of the spring H, before mentioned, until such times as when it is tripped by the indexing mechanism of the machine, as will later be more fully explained.

The shaft B contains a worm M, that meshes with and drives the gear N upon the transverse cam-shaft O, journaled in brackets P, secured to the bed of the machine.

Q, R, and S represent cams upon the shaft for operating the several parts of the machine, as follows: The end cam Q is engaged by an adjustable stop T on slide U, mounted in the frame V, secured to the bed of the machine, said slide being normally held against the cam by the weight W, connected therewith through a cord, as shown. The forward end of the slide contains a head the vertical side edges of which form ways to receive corresponding ways of the vertical head-slide A′, which carries the cutter-shaft B′. Springs C′, mounted intermediate of the top of the head of the reciprocating slide and the transverse plate D′ of the vertical slide, normally hold the head-slide A′ distended upward. The extent of said upward movement is determined by the setting of the head-screw E′, passing freely through the bracket F′ and secured to the lower end of the head-slide, as is clearly shown in Fig. 4.

The plate D' contains a transverse shoulder G' to which is adjustably attached a guide-plate H'. Said guide is made both longitudinally and vertically adjustable by reason of a screw I'', passing through an oblong orifice thereof into the shoulder of the plate D', and by further reason of vertically-disposed adjusting-screws I', mounted in the plate D', with their heads set up against the under side of the guide. The top edge of this guide-plate may be straight, as shown in Fig. 4, or may be cut special, as shown in Figs. 5 and 6, thus accommodating any kind or class of work to be produced. In the operation of the machine the top surface of this guide is slidably engaged by the adjustable pin J', carried in the forward end of the lever K', pivoted to the lug L' upon the top of the frame and whose opposite end is engaged by the intermediate cam R of the cam-shaft. The particular shape of the periphery of this cam is such as to hold the lever in a fixed position throughout the forward movement of the reciprocating slide, but to release said lever, the vertical head-slide, its cutter-shaft and tool during the return movement of the slide, as will be understood.

The vertical head-slide A' contains a series of transverse grooves M' to receive a corresponding transverse rib N' of the cutter-shaft bracket O' and a series of tapped holes to receive the screws P', which pass through slots of the bracket to secure the same to the slide, the construction of said parts being such as to permit the setting or adjusting of the cutter-shaft higher or lower upon the slide for different-size blanks as might be required. Upon one end of the cutter-shaft is mounted a belt-pulley Q', by means of which the cutter-shaft is driven, and upon the other end is attached a cutter R', the particular shape of the teeth of which will obviously vary in accordance with the style of teeth required upon the gear or wheel to be produced. The cutter and its shaft are also made longitudinally adjustable by means of screws S'', engaging the vertical slide and carried in brackets T'', attached to the opposite ends of the cutter-shaft bracket O'.

S' represents an arbor-bracket attached to the bed of the machine; T', an arbor; U', a reduced threaded portion of the arbor to receive the gear-blank V'.

W' is a tail-stock secured to the bed and supporting a spindle X', which bears a threaded socket Y' to receive the threaded end of the arbor. The end of said spindle is preferably provided with a knob Z, as shown, by means of which the spindle may be turned and its sleeve run up against the blank V' to hold the same in position.

Upon the rear end of the arbor S' is secured a ratchet-wheel A'', which is operated by a pawl B'', attached to an arm C'', pivoted to the said arbor and normally held down by a spring D''. This arm is thrown in a forward direction against the action of the spring D'' by the pin E'', slidably mounted in the bed and operated through the lever F'', pivoted to the stud G'', engaged by pin Q'' beneath the cam S. The stud G'' is secured through a slot H'' of the bed by a nut, as shown, which permits of both the stud and lever being shifted longitudinally. An adjustable stop Z' is also provided adjacent to the forward end of the lever F'' for limiting the length of movement of said lever, which stop, together with the above stud, serves for lengthening and shortening the movement of the arm and pawl, thus increasing or diminishing the amount of the feed for the arbor. These adjustments are only required when changing from one size of work to another. The teeth of the ratchet are very fine, and for ordinary coarse work several teeth are traversed by the pawl in each feeding operation.

A pin J'', secured in the face of ratchet-wheel A'', serves to engage the inner end of the lever J with each complete rotation of the said ratchet in a manner to trip the lever and disconnect its outer end from the notch L of the rod G, thus leaving the same free through the action of the spring H to disconnect the shaft and driving-pulley, thus stopping the machine. I have also provided a locking device to engage the ratchet-wheel and hold the arbor against rotation during the milling operation, which comprises the following: Upon the side of the cam R is located a lug K'', which with each rotation of the cam strikes the lever L'', pivoted at M'', operating said lever against the action of the spring N''. The forward end of this lever is operatively connected with a slide O'', mounted in a bracket P'', secured to the side of the frame V. The lower end of the slide is fitted to engage the toothed face of the ratchet-wheel in a manner to prevent the same from turning while the cutting operation is in progress, but adapted to release the ratchet-wheel with each engagement of the lug K'' of the cam with the lever L'' and during the return movement of the reciprocating slide.

A shield R'' is secured to the frame V by means of screws S'' (see Figs. 1 and 7) and serves to stop the throw of chips from the cutter and prevent their dropping into the arbor-feed mechanism.

The operation of my machine is as follows: The cutter-shaft bracket is first set to the proper height desired to accommodate the particular size of blank to be operated upon and is next adjusted lengthwise by the screw S'' to bring the cutter into the proper position over the blank, when the bracket is secured in position by means of the screws P'. If the work to be performed is that of plain straight cuts, as indicated in Figs. 1, 2, and 3, a plain straight-edged guide H', such as is shown in the same figures of the drawings, would be used, whereas if it were a bevel cut y that was wanted the inclined guide H³ shown in Fig. 6 would be employed, and if an oval or rounded tooth x was desired I should attach the curved-edged guide H⁴ shown in Fig. 5. In the plain straight tooth-cutting operation it is practicable to assemble a series of disks side by side and cut through the lot, the same as if in a single piece, and likewise to rotatably feed the same together, as in the indexing operations. The blanks to be cut are placed upon the reduced end U' of the arbor and secured in place by the threaded sleeve Y' of the spindle carried in the tail-stock. The arbor is alternately operated through the pawl-and-ratchet device from the cam-shaft S in a way to feed the arbor a given distance during the disengaged return movement of the cutter. The cutter R' is driven through its shaft by a belt connection with the pulley Q' in a way to continuously operate the same. A second belt connection (not shown) is made with the pulley D, which when connected for starting and running the machine operates the shaft B, its worm, the gear N, and cam-shaft, imparting a rotary movement thereto, which is continuous throughout the cutting of a gear, but which is automatically stopped by the tripping of lever J, the release of rod G, and the clutch connection when the cutting of the gear is completed. The end cam Q together with the weight W impart reciprocating movements to the slide U, the forward movement being slow, while the return is quick. The cutting operations upon the blank are of course performed during the slow forward movement of the slide, and during this movement the horizontal position of the cutter is determined by the shape and position of the guide—that is to say, the guide slides along beneath the pin of the lever K'—and if the top edge of the guide is straight a straight cut is made, whereas if it contains a bevel or oval raise (see Figs. 5 and 6) properly located with relation to the stroke the cutter is forced down gradually operating in a corresponding direction. With each complete rotation of the cam-shaft Q the reciprocating slide makes a return operation, a tooth is finished, and the ratchet is released and fed forward a proper distance. With each complete rotation of the arbor and the finishing of a gear the pin J'' of the ratchet-wheel operates the lever J to release the clutch and stop the machine, except the cutter-shaft, which is driven continuously. The finished gear may then be removed by the turning of the spindle X', when another blank can be put on, the clutch-rod G operated to set the clutch and start the machine for a further operation, as before.

Having thus described my invention, what I claim, and desire to secure by Letters Patent, is—

1. In a gear-cutting machine, the combination of a bed having brackets secured thereon, an arbor mounted in one of such brackets, and means for retaining a gear-blank thereon, means for intermittently rotating the arbor and blank, a cam-shaft and series of cams, a reciprocatory slide operated by one of such cams, a lever operated by another cam of said shaft, a vertically-movable head carried by the slide with means for normally holding it in a raised position, a bracket adjustably attached to the head, a cutter rotatably carried by the bracket, and a guide secured to the head to engage the lever before mentioned to produce straight horizontal or angular cuts.

2. In a gear-cutting machine, the combination with a reciprocating rotary cutter, of an arbor bearing means to receive and retain a gear-blank thereon, a pawl-and-ratchet-indexing device for said arbor, a driving-shaft, a cam upon the shaft and a lever and slide-rod connected to operate the pawl and ratchet, a second lever-and-rod connection with the indexing-ratchet wheel to stop the same and a clutch on the driving mechanism whereby said latter rod is disconnected with each complete rotation of the ratchet-wheel.

3. In a gear-cutting machine, the combination with a bed, of an arbor to support a gear-blank, of a reciprocating slide mounted to operate in the bed, a vertically-movable head carried upon the slide, springs for actuating the head in one direction, a cutter carried upon the head adapted to move across the face of the blank, screws for adjusting the cutter both vertically and sidewise with relation to the blank, a guide carried by the head having an edge to slidably engage a lever of the machine to determine the horizontal line of movement of the cutter and a lever and cam for operating said slide and head against action of the springs.

4. In a gear-cutting machine, the combination with a bed, an arbor supported thereon to support a gear-blank and an indexing device therefor, of a cam-shaft having driving connections, a cam carried on the shaft, a lever connection to said cam for operating the indexing mechanism, a holding device for the indexing mechanism, a lever-and-cam connection with said shaft for releasing said holding device during the indexing operation, a reciprocating slide, a cam and connections for operating the reciprocating slide, a rotary cutter carried by the slide, a cam-and-lever connection for holding the cutter in engagement with a gear-blank during the forward travel of the cutter and adapted to release the cutter from the blank during the return movement.

5. In a gear-cutting machine, the combination with an arbor for supporting a gear-blank, of a reciprocating slide, a vertically-movable head carried upon the slide, springs to normally hold the head distended upward, a cutter carried by the head adapted to operate across the periphery of the blank, a lever and cam for holding the head in a fixed position during the forward travel of the slide, a guide carried by the cutter-head having a special-shaped edge to engage the lever and cause a downward movement of the cutter and head against the resistance of the springs to produce bevel or oval cuts on the blank by a horizontal movement of the slide.

6. In a gear-cutting machine, the combination with a gear-blank-carrying arbor provided with indexing mechanism, of a rotary cutter to operate across the periphery of the blank, a vertically-movable head to support the cutter, a reciprocating slide upon which the head is mounted, a guide carried upon the head, means for adjusting the guide horizontally, vertically and angularly, a lever against which the guide operates during the reciprocating movement of the cutter, and a cam to engage the lever at proper intervals and hold the cutter in engagement with the blank during its cutting operation.

7. In a gear-cutting machine, the combination with a blank-carrying arbor having connected indexing mechanism, of a rotary cutter, a bracket in which the cutter-shaft is mounted and having transverse ribs, a vertically-movable head-slide having grooves to receive the ribs, bolts for detachably and adjustably connecting the cutter-bracket to said head-slide so as to adjust the cutter to and from the center of the arbor in both a vertical and horizontal plane, a reciprocating slide supporting the head-slide, and a lever and cam to engage the head-slide for causing a downward movement of the cutter at the end of its strokes.

Signed at Bridgeport, in the county of Fairfield and State of Connecticut, this 23d day of January, A. D. 1906.

WATSON A. JORDAN.

Witnesses:
  C. M. NEWMAN,
  WILLIAM V. DEVITT.